United States Patent [19]

MacMillan

[11] Patent Number: 5,182,965
[45] Date of Patent: Feb. 2, 1993

[54] ADJUSTABLE LENGTH HANDLE COMPRISING AUTOMATICALLY ADJUSTABLE LENGTH MECHANICAL POWER TRANSMISSION

[75] Inventor: Donald M. MacMillan, Chilliwack, Canada

[73] Assignee: Concorde Tool Corp., Surrey, Canada

[21] Appl. No.: 787,036

[22] Filed: Nov. 4, 1991

Related U.S. Application Data

[63] Continuation-in-part of Ser. No. 588,055, Sep. 24, 1990, Pat. No. 5,088,147.

[51] Int. Cl.$^5$ .............................................. G05G 1/10
[52] U.S. Cl. ........................................ 74/543; 74/529
[58] Field of Search .................. 74/543, 545, 528, 529, 74/562; 30/250

[56] References Cited

U.S. PATENT DOCUMENTS

| | | | |
|---|---|---|---|
| 2,682,912 | 7/1954 | Johnson et al. | 74/529 X |
| 2,684,129 | 7/1954 | Jaseph | 74/529 X |
| 2,827,694 | 3/1958 | Trippler | 30/250 X |
| 5,088,147 | 2/1992 | MacMillan | 15/144 B |

*Primary Examiner*—Leslie A. Braun
*Assistant Examiner*—Nicholas Whitelaw
*Attorney, Agent, or Firm*—Robert W. Jenny

[57] ABSTRACT

The handle comprises two elongated structural elements slidably engaged to move relative to each other parallel to their longitudinal axes with mechanical power transmission apparatus attached to the handle and also comprising two elongated elements engaged such that they are moveable relative to each other parallel to their longitudinal axes. The length of the power transmission apparatus adjusts automatically to match adjustment of the length of the handle. A rotary power transmission apparatus is disclosed.

2 Claims, 1 Drawing Sheet

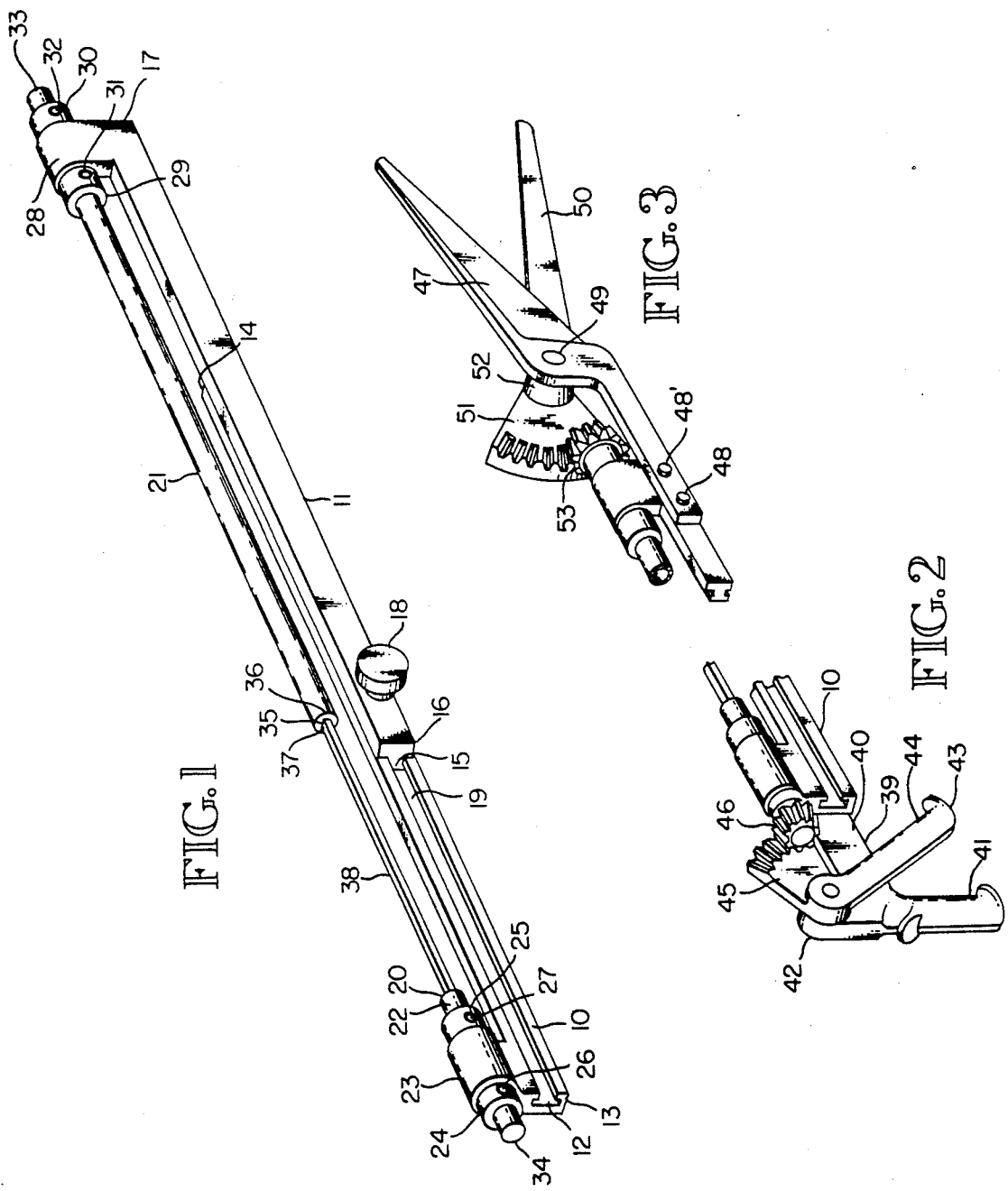

ADJUSTABLE LENGTH HANDLE COMPRISING AUTOMATICALLY ADJUSTABLE LENGTH MECHANICAL POWER TRANSMISSION

This application is a continuation-in-part application of U.S. patent application Ser. No. 588,055, filed Sep. 24, 1990, entitled Adjustable Length Handle for Flat Finishers, on which U.S. Pat. No. 5,088,147 has been issued.

BACKGROUND OF THE INVENTION

In '147 the apparatus comprises telescopic tubes as the main structural elements of the handle and the primary components for the mechanical power transmission from one end of the handle to the other operate linearly, i.e. move along their long axes and transmit power with tensile or compressive loads.

Field

The subject invention is in the field of hand held tools particularly those comprising a long handle such as used in garden tool pruning apparatus and the like. More particularly it is in the field of handles which are adjustable in length such as the handles of pruning apparatus and, most specifically, handles like those used on flat finishing boxes used in the drywall construction industry. With such handles mechanism at one end of the handle operates mechanism at the other end, thus requiring mechanical power transmission from one end to the other.

The primary objective of the subject invention is to provide an adjustable length handle incorporating automatically adjustable length mechanical power transmission apparatus which is usable with any suitable interacting mechanisms attached to the handle, any suitable adjustable length structure and either linear or rotary power transmission apparatus.

SUMMARY OF THE INVENTION

The subject invention is an adjustable length handle incorporating mechanical power transmission apparatus for transmitting power from one point along the length of the handle to another, specifically from one end of the handle to its other end. The length of the power transmission apparatus is automatically adjusted with adjustment of the length of the handle. The apparatus used to apply power to the transmission apparatus and the apparatus using transmitted power are not part of the invention although embodiments for applying and using power are described for illustrative purposes. In the subject handle the handle structure comprises two bars of essentially rectangular cross-sectional shape. There is a T-shaped slot extending from end to end of one of the bars, preferably in one of its broad surfaces and a T-shaped extension extending from end to end of the other bar, preferable from one of its broad surfaces. Engaging the T-shaped extension in the T-shaped slot engages the two bars so that they are slidable longitudinally with respect to each other and each bar has an engaged end and a free end. There is a journal at each free end. The axes of the journals are coincident and parallel to the longitudinal axes of the slidably engaged bars of the handle. There are also two slidably engaged rotating components, preferable shafts, each having an engaged end and a free end. The free end of one shaft is fitted into one of the journals, free to rotate in the journal and restricted from sliding in it. The free end of the other shaft is fitted into the other journal in a similar way. The shafts (rotating components), while free to move linearly with respect to each other, are constrained to rotate together. The constraint may be achieved, for example, by using a key on one shaft and a key slot in the other, or by having one shaft square over the part of it not fitted in the journal, with the square part engaging a square hole in the engaged end of the other shaft. The two engaged shafts provide a mechanical power transmission from one (free) end of the handle to the other (free) end. The handle length is adjusted by sliding one bar relative to the other. The adjustment is fixed at any setting by a set screw threaded through one bar and contacting the other, the set screw being fitted with a handle or knob.

When the length of the handle is adjusted the length of the mechanical power transmission is automatically adjusted. The length of the handle, in another embodiment of the invention, may be adjusted using a threaded shaft mounted on journals on one of the slidably engaged components of the handle and a nut attached to the other, whereby rotating the threaded shaft adjusts the length and sets the length at any adjusted setting by virtue of the fact that forces on the nut cannot rotate the screw. A crank is provided to rotate the threaded shaft, whereby the length of the handle is adjustable from the location of the crank, preferably at the free end of the handle at which power to operate the transmission is supplied.

An adaptation of the handle for use in adjustable length pruning shears is described to illustrate an example of the use of the subject invention. In the pruning shears a lever is pivoted to the "power input" free end of the handle with the pivot axis transverse to the longitudinal axis of the handle. A segment of a bevel gear is attached to the lever and the teeth of the segment engage a bevel pinion gear attached to the transmission shaft. Operating the lever thus rotates the transmission shaft. Similar gearing at the output end of the shaft converts the transmission shaft rotation to relative rotation of the blades of a shears. Auxilliary grips, handles, straps, and the like may be used enhance the usability of the shears.

The invention is described in more detail below with reference to the attached drawings.

BRIEF DESCRIPTION OF THE DRAWINGS

FIG. 1 is an isometric view of the subject invention, foreshortened.

FIG. 2 is an isometric view of the lever apparatus for imparting rotation to the transmission shaft.

FIG. 3 is an isometric view of a shears powered by the output end of the transmission shaft.

DETAILED DESCRIPTION OF THE INVENTION

The subject invention is an adjustable length handle which incorporates a mechanical power transmission between its ends and the length of the transmission adjusts antomatically with adjustment of the handle length. One embodiment of the invention is shown in an isometric view in FIG. 1. The handle comprises bars 10 and 11, the structural elements of the handle. Bar 10 has a T-shaped slot 12 extending from its end 13 to end 14. Bar 11 has a T-shaped portion 15 extending from its end 16 to end 17. The T-shaped portion fits freely and snugly into the slot so that the two bars are slidably connected with the T-shaped portion inserted into the slot. Knob 18 is attached to a set screw threaded into a threaded hole in bar 11. The length of the handle can be set at any adjusted length by turning the knob to force the setscrew against the bottom surface 19 of the slot.

The mechanical power transmission comprises shafts 20 and 21, the primary components of the power transmission. Shaft 20 has a cylindrical portion 22 fitted into journal 23 shown as an integral part of bar 10 at end 13. Longitudinal position of shaft 20 in journal 23 is set and maintained by collars 24 and 25, held in place respectively by set screws 26 and 27. Shaft 21 is similarly installed in journal 28 at end 17 with collars 29 and 30 and set screws 31 and 32. End 33 of shaft 20 and end 34 of shaft 21 extend beyond collars 24 and 30 respectively for purposes explained below.

Shaft 21 is tubular and has a cap 35 at its end 36. Shaft 20 has a square cross-sectional shape except for the cylindrical portion 22, and cap 35 has a square hole 37 at its center. Square portion 38 of shaft 20 engages the square hole closely and freely so that the two shafts are constrained to rotate together and the length of the mechanical transmission changes with the variation of the amount of the square portion inserted into the tubular shaft. Any of a variety of matching shapes of hole and shaft crossection may be used to constrain the shafts to rotate together, a pinion rod and mating shaped hole being one example.

A linear motion mechanical transmission apparatus as disclosed in U.S. patent application Ser. No. 588,055, filed Sep. 24, 1990, could be used in the subject handle in place of the rotary transmission apparatus described herein. Similarly, the rotary transmission shaft described herein can be adapted for use in the adjustable length handle of the apparatus of Ser. No. 588,055. The rotary power transmission components are always engaged. The linear power transmission components engage when power is applied and disengage when it is not applied.

FIGS. 2 and 3 illustrate an example use of the subject handle. FIG. 2 shows a lever and gear apparatus for driving, i.e. applying power to the transmission and FIG. 3 illustrates a shears, comprising a fixed blade and a gear driven blade, driven by (i.e. using the power output of) the transmission.

Referring to FIG. 2, bracket 39 is attached to bar 10 by fasteners not visible in this view and comprises extension portion 40, handle 41 and journal portion 42. Bellcrank 43 comprises lever 44 and bevel gear segment 45. Segment 45 engages bevel pinion 46 attached to end 33 of shaft 20. Moving the lever toward the handle rotates the transmission shaft. Spring return apparatus, not shown, can be used to move the lever away from the handle and can be installed between the handle and lever or torsionally around the shaft or at the driven mechanism.

Referring to FIG. 3, blade 47 is attached to bar 11 by fasteners 48 and 48' and comprises a pivot hole 49. Blade 50 is pivoted to blade 47 by a fastener in hole 49 and further comprises bevel gear segment 51 and spacer portion 52. Segment 51 engages bevel pinion 53 which is attached to end 34 of shaft 21 whereby rotation of the transmission by the handle/lever driving apparatus operates the driven shears apparatus.

It is considered to be understandable from this description that the subject invention meets its objective. It provides an adjustable length handle incorporating automatically adjustable length mechanical power transmission apparatus which is usable with any suitable interacting mechanisms attached to the handle, any suitable adjustable length structure and either linear or rotary mechanical power transmission apparatus.

It is also considered to be understood that while certain embodiments of the invention are described herein, other embodiments and modifications of those described are possible within the scope of the invention which is limited only by the attached claims.

I claim:

1. An adjustable length handle incorporating adjustable length mechanical power transmission apparatus, said handle comprising:

first and second structural components, having first and second longitudinal axes, said components being slidably interconnected such that relative motion between said components is parallel to said longitudinal axes, means for unlockably locking to each other, said mechanical power transmission apparatus comprising first and second transmission components, said first and second transmission components having third and fourth longitudinal axes, said first, second, third and fourth longitudinal axes being parallel, said first transmission component being mounted on said first structural component, said first and second transmission components being slidably interconnected by interconnecting means for transmitting power, said interconnecting means allowing relative motion between said transmission components parallel to said longitudinal axes, whereby said length of said adjustable length mechanical power transmission apparatus is adjusted automatically when the length of said adjustable length structure is adjusted.

2. The handle of claim 1 in which said mechanical power transmission apparatus is rotatably mounted on said slidably interconnected structural components.

* * * * *